Feb. 18, 1936.　　　　S. K. BISHOP　　　　2,031,248
SEAT ADJUSTER
Filed May 26, 1934　　　　2 Sheets-Sheet 1
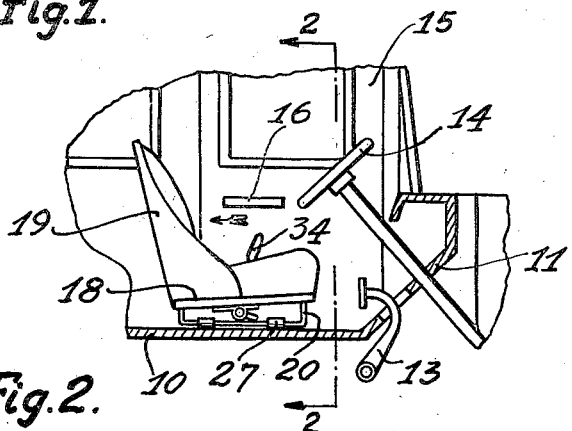
Fig.1.
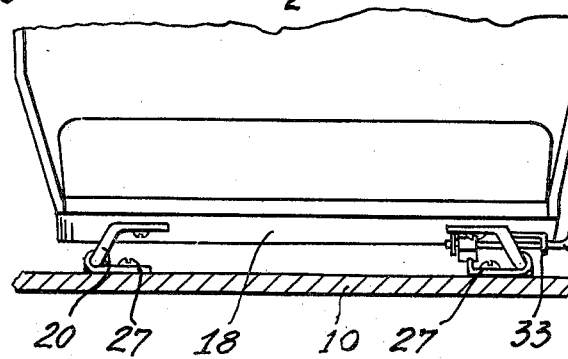
Fig.2.
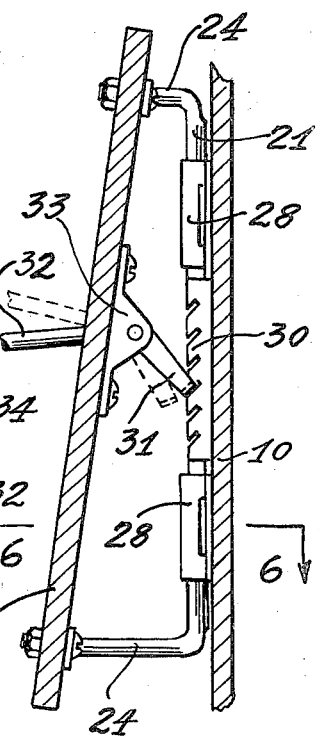
Fig.5.
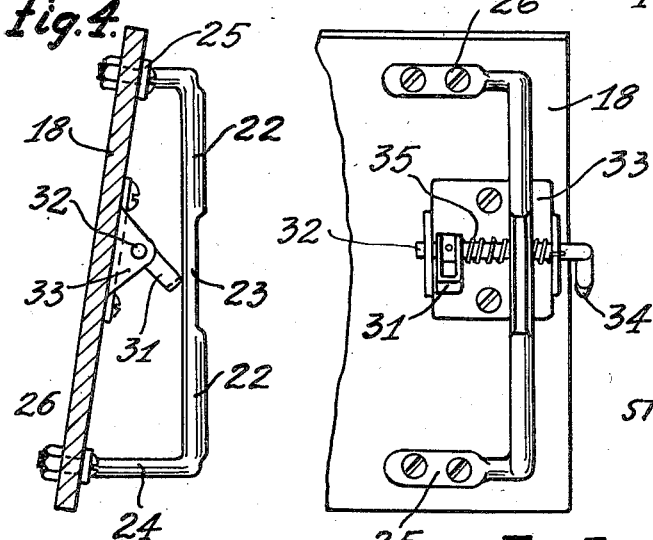
Fig.4.
Fig.3.
STANLEY K. BISHOP.
INVENTOR.
BY Louis Illmer
ATTORNEY

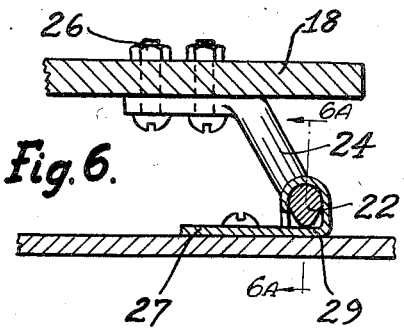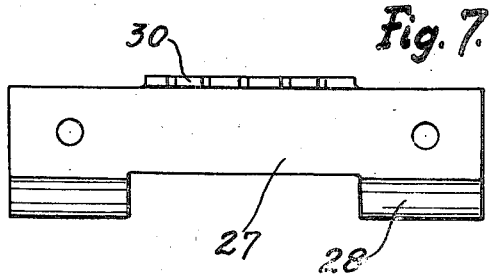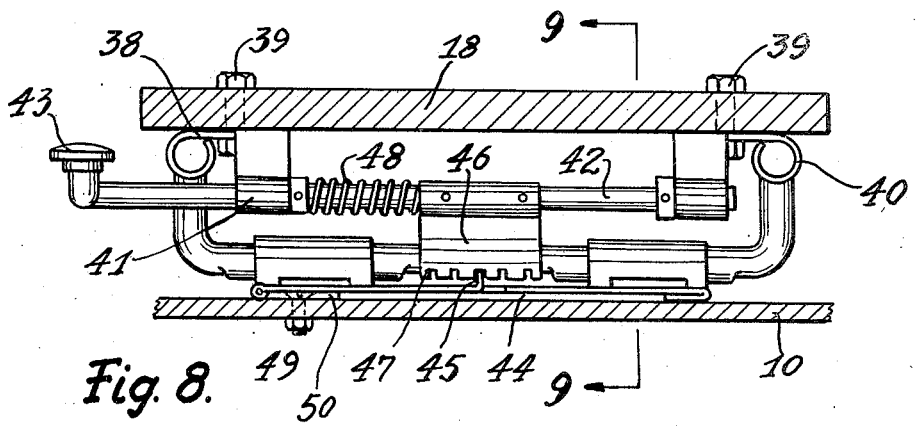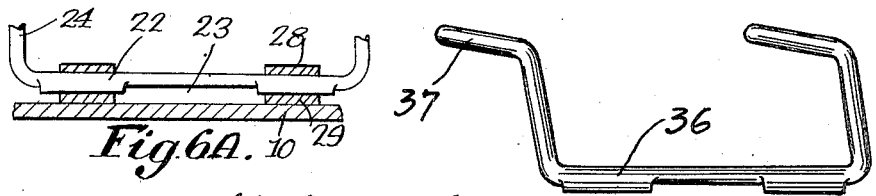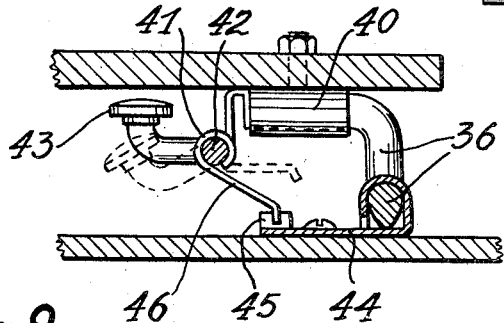

Patented Feb. 18, 1936

2,031,248

UNITED STATES PATENT OFFICE 2,031,248

SEAT ADJUSTER

Stanley K. Bishop, Binghamton, N. Y., assignor to The Brewer-Titchener Corporation, Cortland, N. Y., a corporation of New York Application May 26, 1934, Serial No. 727,684

4 Claims. (Cl. 155—14)

This invention relates to efficient and compact appurtenances for conveniently adjusting vehicle or other seats, and in particular provides for a comfortable driver's seat that can readily be shifted into a different position to allow unfettered manipulation of the control pedals of an automobile or the like.

A feature of the present invention resides in the use of companion guide rails or relatively slidable carrier members across which the seat is mounted in an improved manner. Each such guide rail or skid assembly is built up for compact installation beneath a conventional motor vehicle seat and is designed to include rectilinear runner means that when loaded, are disposed to slide reasonably free without need of roller or similar anti-friction means. A suitable latching mechanism is cooperatively mounted upon one such skid unit to positively retain the seat in its adjusted position.

The primary object of my improvements is to afford a durable and self-contained commodity of the character indicated that comprises few simple but sturdy new equipment parts capable of being easily fabricated and installed at the minimum of factory cost.

A further object is to devise seat adjusting members in which a manipulative shift handle may be placed within convenient reach, either forwardly or to the side of the driver without unduly complicating the seat understructure.

To this end, and the accomplishment of other new and useful results, said invention also consists in other novel runner features, all of which will hereinafter be more fully set forth.

Reference is had to the accompanying two sheets of drawings which are illustrative of certain specific embodiments of my improvements, particularly as applied to automotive purposes, and in which:

Fig. 1 is a fragmentary elevational view as taken in longitudinal section through the body portion of a motor car schematically showing the front seat equipped with my devices, while Fig. 2 is a front view of such seat appurtenances as seen from the line 2—2 of Fig. 1.

Fig. 3 represents a bottom view of my sledlike runner together with associated seat latching details; and Fig. 4 is a side view thereof as removed from its sole plate.

Fig. 5 shows a side elevation of a skid assembly while Fig. 6 depicts a cross-sectional view as taken along line 6—6 of Fig. 5.

Fig. 6A represents a cross-sectional detail along 6A—6A of Fig. 6 to show the use of raised floor pads.

Fig. 7 details a plan view of the sole plate element of my guide rail assembly as used in connection with the Fig. 5 disclosure.

Fig. 8 illustrates a modified carrier assembly substantially similar to Fig. 5 but in which the latching mechanism is disposed longitudinally instead of transversely; and Fig. 9 is a cross-sectional view thereof as taken along line 9—9.

Fig. 10 shows a perspective view of the runner utilized in the Fig. 8 style of seat skid.

Referring first to Fig. 1, this schematically indicates certain conventional automobile elements indirectly associated with my seat adjuster; namely, a body floor 10, an upturned foot board 11, a car control pedal 13, a steering wheel 14, and a front door 15 having an overhanging arm rest 16 attached thereto. Located rearwardly of said wheel, is shown a transversely disposed driver's seat which embodies my improved devices.

The conventional wooden rectangular base or cushion framework 18 together with the back 19 of this seat are slidably mounted across a pair of laterally spaced guide rail units. In the exemplification given in Figs. 2 to 7, each such seat upholding unit comprises unitary skid means 20 that are preferably bent up from continuous round metallic bar stock to comprise a rectilinear sole plate contacting section. Said section may be cross-sectionally shaped to constitute one or more aligned knife edge lengths or the like acute riding edges such as 22 which are preferably slightly rounded in profile as in Fig. 6. These runner edges may be provided with a longitudinal recess or gap 23 therebetween in order to concentrate the supported seat load upon a relatively small bearing area.

Each opposite end of said rectilinear skid section may be sharply turned into parallelism to provide for complementary uprights or spacer struts 24 as shown in Fig. 4, while the respective terminal regions thereof may be given a further rectangular bend to form a flattened attaching lug or the like brace shank 25 in the manner indicated in Fig. 3. The respective perforated lugs may have the seat frame 18 superimposed thereon and which parts may be secured together by the screws 26. It will be observed that the respective terminal regions 25 of the described skid structure are purposely made to stand crosswise of and in a laterally offset relation with respect to the knife edge 22. The strut 24 is obliquely interposed therebetween and arranged to impart adequate lateral rigidity to the depending runner elements should such understructure be subjected to any heavy thrust directed lengthwise of the superimposed seat. By the use of long and short strut lengths as in Fig. 4, the seat base may be set at a slope relative to the floor level.

Fixedly attached to the body floor 10, is a pair of oppositely disposed sheet metal rails or sole plates such as 27 which are each provided with aligned tubular guideways 28 that are axially spaced apart and loosely curled about the runner section of the skid 20 in the fashion represented in Fig. 6 and which complementary guideways respectively provide for a substantially flat riding face or comparatively short pad portion 29 between which to freely slide the contacting face of the embraced runner. Fig. 6A shows the characteristic manner in which my runner knife edge 22 is intended to span and slidably rest upon such pair of upturned longitudinally spaced pad faces 29 in a raised relationship to the level of the body floor 10. The use of four such set apart guideway pads as confined to the respective corner regions of my seat, make for an easily shiftable framework that is free from cocking or other binding effects. The respective overhanging curled portions of said guideways retain their embraced runners against rearward seat tilt.

A longitudinal edge portion of one such sole plate may be upturned to form a lip 30 having a series of obliquely disposed notches cut therein as shown. I also provide for a manipulative latch toe 31 adapted to selectively engage one of the stepped notches when the seat has been shifted into adjusted position. This toe is fixedly secured upon the L shaped adjusting rod 32 of which one leg is rotatably supported by the depending bracket 33. Said rod leg is here mounted crosswise of the runner axis and preferably extends outwardly beyond one seat end while the other rod leg may be turned upwardly as a rocker arm and provided with a handle or grip 34. In Fig. 1 this grip member is shown sheltered immediately beneath the arm rest 16 and placed within convenient reach of the car driver.

When said handle is drawn rearwardly toward the seat back in the direction of the arrow, it will cause the latch toe 31 to be raised out of engagement with a notch 30 into the dotted outline position of Fig. 5, whereupon the occupant may unobstructedly move the loaded seat lengthwise of its runners within limits until one of the struts 24 interferes with a guideway 28. After having located the preferred seat position, the rocker handle 34 is released and the toe allowed to drop into a contiguous notch. The finding of a contiguous notch is facilitated by the spiral spring 35 of which one end bears against the bracket 33 while its other end is arranged to resiliently thrust the latch toe toward the upstanding lip 30.

Referring now to the modified seat structure illustrated in Figs. 8 to 10, this is essentially identical in underlying principle to the foregoing devices except that the adjusting rod has been extended parallel, instead of crosswise, with the guide rails. To this end, it is also preferred to alter the configuration of the modified runner designated 36 in Fig. 10 without resort to any flattened lugs such as 25. As a lug substitute, I here provide for a pair of round stock shanks 37 which are respectively engaged by complementary clamplike fixtures each having a flat plate region 38 which may be securely fastened to the framework 18 by bolts 39. One edge of each such clamp may be equipped with a transverse trough as at 40 adapted to tightly grip therein, a terminal or shank 37 of the runner 36. Said clamp may further carry a guide eyelet 41 through which is threaded the adjusting rod 42 of which one end extends forwardly where the rod is offset to provide for the manipulative knob 43.

The alternative sole plate 44 is similar to that described in connection with Fig. 7 except for the upstanding lip 45 which is here turned transversely of the runner length. In the present instance, it is preferred to fixedly mount an overhanging keeper plate 46 upon the rotatable rod 42 and notch the plate edges at 47, as shown. The keeper spring 48 acts in a similar capacity to the spring 35. Said notches are arranged to selectively receive the lip 45, it being apparent that by depressing the knob 43 into the dotted position of Fig. 9, it will release the keeper plate 46 and allow the seat to be freely shifted lengthwise of its supporting runners, all of which operations are deemed obvious in view of the foregoing explanation.

In use, my skid runners are intended to be kept suitably lubricated. When well lubricated, the described localized contact between my runners and their respective sole plates as herein practiced, allows my loaded seat to be shifted with comparatively little effort without resort to special ball bearings or the like antifriction means. If desired, each forward end of the respective sole plates 44 may be suitably fulcrumed by the pintle 48 of the hinge leaf element 50 which may be secured to the floor. Such provision allows the rails and seat to be bodily tilted about their respective pintles. Both of my alternative guide rails are characterized by a comparatively low structural height, which permits of using a corresponding deep seat cushion for a given overall dimension as measured above the floor level. It is also pointed out that my manipulative rod handle 34 and likewise the knob 43 travel in unison with the shiftable seat so as to maintain a relatively fixed reach position with respect to the driver in all adjusted seat positions.

Furthermore, the guideways 28 of the respective sole plates are intended to bear down upon the embraced runner sufficiently to prevent seat rattle; when the seat becomes heavily loaded the inherent resiliency of the sole plate allows the runner to recede somewhat from the top portion of such guideway and thereby tends to ease the frictional drag when shifting the loaded seat. The arrangement of my seat adjusting members is such that their component parts may be compactly shipped in fitted sub-assemblies and readily installed into place; when installed, the terminal region of each runner 20 is so shaped and secured as to afford a well braced and laterally rigid skid for the superstructure carried thereon.

It is to be understood that the described seat adjusting appurtenances also find application to other than the featured vehicle purposes, and that various structural changes in the details or disposition thereof may be resorted to in likewise carrying out my illustrative embodiments, all without departing from the spirit and scope of my invention heretofore described and more particularly pointed out in the appended claims.

I claim:

1. In an adjustable seat, the combination of a stationary sole plate comprising a pair of comparatively short tubular guideways that are axially spaced apart and respectively provided with an upturned relatively flat pad face, a shiftable framework superimposed upon the sole plate in raised relationship, and a one-piece skid member terminating in a pair of similar brace shanks and which member is interposed between the sole plate and the framework with both brace shanks secured to said shiftable framework, the medial region of said skid member including a comparatively long rectilinear runner section entered through both guideways for longitudinal movement therealong and the transverse profile of said runner section being provided with a cross-sectionally acute riding edge that rests upon and slidably engages the aforesaid pad faces along a single localized line of contact.

2. In an adjustable seat, the combination of a sole plate equipped with complementary tubular guideways which each include a relatively flat raised pad portion that are respectively set apart lengthwise of the sole plate, a shiftable framework superimposed over the sole plate, and skid means interposed between the sole plate and the framework and which means include a rectilinear runner section provided with an acute riding edge arranged to slidably engage the respective pad portions along a single localized line of contact, said riding edge being kept spaced from the sole plate between the respective pad portions thereof and being disposed to rest upon the respective pad portions.

3. An adjustable seat comprising a sole plate provided with runner guide means, a shiftable rectangular framework superimposed upon the sole plate, skid means interposed between the sole plate and the framework to include a rectilinear runner section mounted to ride upon the guide means and having a spacer strut section adjoined to each runner end extending upwardly toward the framework and which struts respectively terminate in a brace shank disposed in an axially crosswise relation with respect to the runner length, complementary bracket fixtures attached to the framework in spaced relationship and which fixtures each include a clamping trough that are respectively disposed to grip a different brace shank, and a manipulative latch rod carried by and rotatably mounted between said fixtures.

4. An adjustable seat comprising a sole plate provided with runner guide means, a shiftable rectangular framework superimposed upon the sole plate, skid means interposed between the sole plate and the framework to include a rectilinear runner section mounted to ride upon the guide means and having a spacer strut section integrally adjoined to each runner end to extend upwardly toward the framework and which struts respectively terminate in a brace shank disposed in an axially crosswise relation with respect to the runner length, complementary bracket fixtures each comprising a plate member attached to the framework and which plate is provided with depending clamping trough and guide eyelet means of which the respective axes are arranged in rectangular relationship, the clamping trough of said fixtures being respectively disposed to grip a different brace shank therein, and a manipulative latch rod extending between said fixtures and rotatably mounted in the respective eyelet means thereof.

STANLEY K. BISHOP.